US011183853B2

United States Patent
Gluzman et al.

(10) Patent No.: US 11,183,853 B2
(45) Date of Patent: *Nov. 23, 2021

(54) WIRELESS POWER TRANSMITTER AND METHOD OF ERROR DETECTION DURING USE THEREOF

(71) Applicant: POWERMAT TECHNOLOGIES LTD., Petah Tiva (IL)

(72) Inventors: Ilya Gluzman, Holon (IL); Oola Greenwald, Mevasseret Zion (IL); Elieser Mach, Rosh Tzurim (IL); Oz Moshkovich, Rehovot (IL); Guy Raveh, Mataa (IL)

(73) Assignee: POWERMAT TECHNOLOGIES LTD., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,359

(22) Filed: Jun. 2, 2020

(65) Prior Publication Data

US 2020/0295602 A1    Sep. 17, 2020

Related U.S. Application Data

(63) Continuation of application No. 16/439,943, filed on Jun. 13, 2019, now Pat. No. 10,673,249, which is a
(Continued)

(51) Int. Cl.
*H02J 5/00* (2016.01)
*H02J 7/02* (2016.01)
(Continued)

(52) U.S. Cl.
CPC .......... *H02J 5/005* (2013.01); *H02J 7/00036* (2020.01); *H02J 7/025* (2013.01); *H02J 50/10* (2016.02);
(Continued)

(58) Field of Classification Search
CPC ........ H02J 5/005; H02J 50/10; H02J 7/00036; H02J 7/025; H04B 5/0037; H04B 5/0075
See application file for complete search history.

(56) References Cited

U.S. PATENT DOCUMENTS 10,673,249 B2 * 6/2020 Gluzman ............. H04B 5/0075
2008/0231120 A1   9/2008 Jin
(Continued)

OTHER PUBLICATIONS

International Preliminary Report on Patentability Chapter I dated Apr. 4, 2017 for PCT International Application No. PCT/IL2015/050985.
(Continued)

*Primary Examiner* — Jared Fureman
*Assistant Examiner* — Duc M Pham
(74) *Attorney, Agent, or Firm* — Volpe Koenig

(57) ABSTRACT

A method of detecting a foreign object presence between a wireless power transmitter and a wireless power receiver, the wireless power transmitter comprising a primary coil for transferring power wirelessly to a secondary coil of the wireless power receiver, comprises: transmitting a calibration ping signal; measuring and recording decay time of the calibration ping signal; transmitting test ping signal; measuring and recording decay time of the test ping signal; and determining the foreign object presence if the decay time of the test ping signal is smaller than decay time of the calibration ping signal and if an absolute value of a difference between them is above a threshold. In addition, or alternatively, a self-frequency of a decaying calibration ping signal is measured and recorded; a self-frequency of a decaying test ping signal is measured and recorded; and the foreign object presence is determined if a difference between
(Continued)

the self-frequency of the decaying test ping signal and the self-frequency of the decaying calibration ping signal falls outside a predetermined value.

20 Claims, 16 Drawing Sheets

Related U.S. Application Data continuation of application No. 15/517,358, filed as application No. PCT/IL2015/050985 on Oct. 1, 2015, now Pat. No. 10,361,566.

(60) Provisional application No. 62/058,679, filed on Oct. 2, 2014.

(51) Int. Cl.
*H02J 50/10* (2016.01)
*H02J 7/00* (2006.01)
*H04B 5/00* (2006.01)

(52) U.S. Cl.
CPC ......... *H04B 5/0037* (2013.01); *H04B 5/0075* (2013.01)

(56) References Cited

U.S. PATENT DOCUMENTS

| | | |
|---|---|---|
| 2009/0121675 A1 | 5/2009 | Ho et al. |
| 2011/0204711 A1 | 8/2011 | Norconk et al. |
| 2012/0068550 A1 | 3/2012 | Boer et al. |
| 2013/0234532 A1 | 9/2013 | Fells et al. |
| 2014/0077617 A1 | 3/2014 | Nakano et al. |
| 2014/0103869 A1 | 4/2014 | Radovic et al. |
| 2015/0054355 A1 | 2/2015 | Ben-Shalom et al. |
| 2015/0207333 A1 | 7/2015 | Baarman et al. |
| 2016/0181874 A1 | 6/2016 | Raveh et al. |
| 2016/0187520 A1 | 6/2016 | Widmer et al. |
| 2016/0329751 A1 | 11/2016 | Mach et al. |
| 2016/0352390 A1* | 12/2016 | Park ................ H04B 5/0037 |
| 2017/0033591 A1 | 2/2017 | Govindaraj et al. |

OTHER PUBLICATIONS

International Search Report dated Dec. 27, 2015 for PCT International Application No. PCT/IL2015/050985.

* cited by examiner

WIRELESS POWER TRANSMITTER AND METHOD OF ERROR DETECTION DURING USE THEREOF

CROSS-REFERENCE TO RELATED APPLICATIONS

This application is a continuation of U.S. patent application Ser. No. 16/439,943, filed Jun. 13, 2019, which in turn is a continuation of U.S. patent application Ser. No. 15/517,358, filed Apr. 6, 2017, now U.S. Pat. No. 10,361,566, which in turn is a U.S. National Phase Application filing under 35 U.S.C. § 371 of PCT Patent Application No. PCT/IL2015/050985, filed Oct. 1, 2015, which in turn is based upon and claims the benefit of the filing date of U.S. Provisional Patent Application Ser. No. 62/058,679, filed Oct. 2, 2014, each of which is incorporated herein by reference.

FIELD OF THE INVENTION

The present invention relates to a system and method for monitoring efficiency and controlling power transfer across a wireless power coupling.

BACKGROUND OF THE INVENTION

Wireless power coupling allows electrical energy to be transferred from a power supply to an electric load without connecting wires. A power supply is wired to a primary coil and an oscillating electric potential is applied across the primary coil which induces an oscillating magnetic field therearound. The oscillating magnetic field may induce an oscillating electrical current in a secondary coil, placed close to the primary coil. In this way, electrical energy may be transmitted from the primary coil to the secondary coil by electromagnetic induction without the two coils being conductively connected. When electrical energy is transferred inductively from a primary coil to a secondary coil, the pair are said to be inductively coupled. An electric load wired in series with such a secondary coil may draw energy from the power source when the secondary coil is inductively coupled to the primary coil.

Leaks may arise if a foreign object, for example one which is metallic and/or magnetic, is located between the primary and secondary coils during charging. Besides inefficiencies which may arise owing to lost energy, the presence of a foreign object within an inductive couple may result in parasitic heating, thereby posing a hazard.

SUMMARY OF THE INVENTION

According to one aspect of the presently disclosed subject matter, there is provided a wireless power transmitter for inductive power transmission to a wireless power receiver, the wireless power transmitter comprising:
  a primary coil to transfer power to a secondary coil of the wireless power receiver;
  a power supply;
  a driver to provide an electric potential from the power supply to the primary coil;
  a monitoring system to measure electrical flow parameters of the primary coil, and to filter the measured electrical flow parameters based on one or more filter characteristics (i.e., signal processing is applied which removes the filter characteristics), thereby producing a response signal; and
  a controller to direct operation of the wireless power transmitter;
wherein the controller is configured to perform error checking by:
  directing the driver to provide the electric potential as a superposition of a transmission signal and a sensing signal, the filter characteristics comprising electrical flow parameters of one of the transmission and sensing signals; and
  detecting, based a difference between one or more electrical flow parameters of the response signal and of the other of the transmission and sensing signals, an error condition indicative of a foreign object between the primary and secondary coils.

The frequency of the sensing signal may be substantially different from the frequency of the transmission signal.

The filter characteristics may comprise electrical flow parameters of the transmission signal. Thus, when there is no error condition, the response signal is expected to be the same as the sensing signal.

The frequency of the sensing signal may be constant.

The controller may be configured to vary the frequency of the transmission signal during the power transmission.

The controller may be further configured to facilitate, when the error condition is detected, interrupting the electrical potential to the primary coil. This may comprise directing the driver to cease providing the electric potential.

The controller may be configured to perform the error checking in an ongoing manner during the power transmission.

The controller may be configured to perform the error checking continuously during the power transmission.

The controller may be configured to perform the error checking at intervals during the power transmission.

The controller may comprise a comparator.

According to another aspect of the presently disclosed subject matter, there is provided a method of detecting an error condition, indicative of a foreign object between a wireless power transmitter and a wireless power receiver, said wireless power transmitter comprising a primary coil for transferring power wirelessly to a secondary coil of said wireless power receiver, the method comprising:
  providing an electric potential, being a superposition of a transmission signal and a sensing signal, to the primary coil;
  measuring electrical flow parameters of the primary coil;
  filtering the measured electrical flow parameters based on one or more filter characteristics (i.e., signal processing is applied which removes the filter characteristics), thereby producing a response signal;
  comparing one or more electrical flow parameters of the response signal with corresponding electrical flow parameters of one of the transmission and sensing signals; and
  determining, based on the comparing, whether or not the error condition exists.

The frequency of the sensing signal may be substantially different from the frequency of the transmission signal.

The filter characteristics may comprise electrical flow parameters of the transmission signal. Thus, when there is no error condition, the response signal is expected to be the same as the sensing signal.

The frequency of the sensing signal may be constant.

The frequency of the transmission signal may vary during the power transmission.

The method may further comprise, when the error condition is detected, interrupting the electrical potential to the primary coil.

The error checking may be performed in an ongoing manner during the power transmission.

The error checking may be performed continuously during the power transmission.

The error checking may be performed at intervals during the power transmission.

The wireless power transmitter may further comprise a comparator.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DETAILED DESCRIPTION OF THE INVENTION

Figure 1:
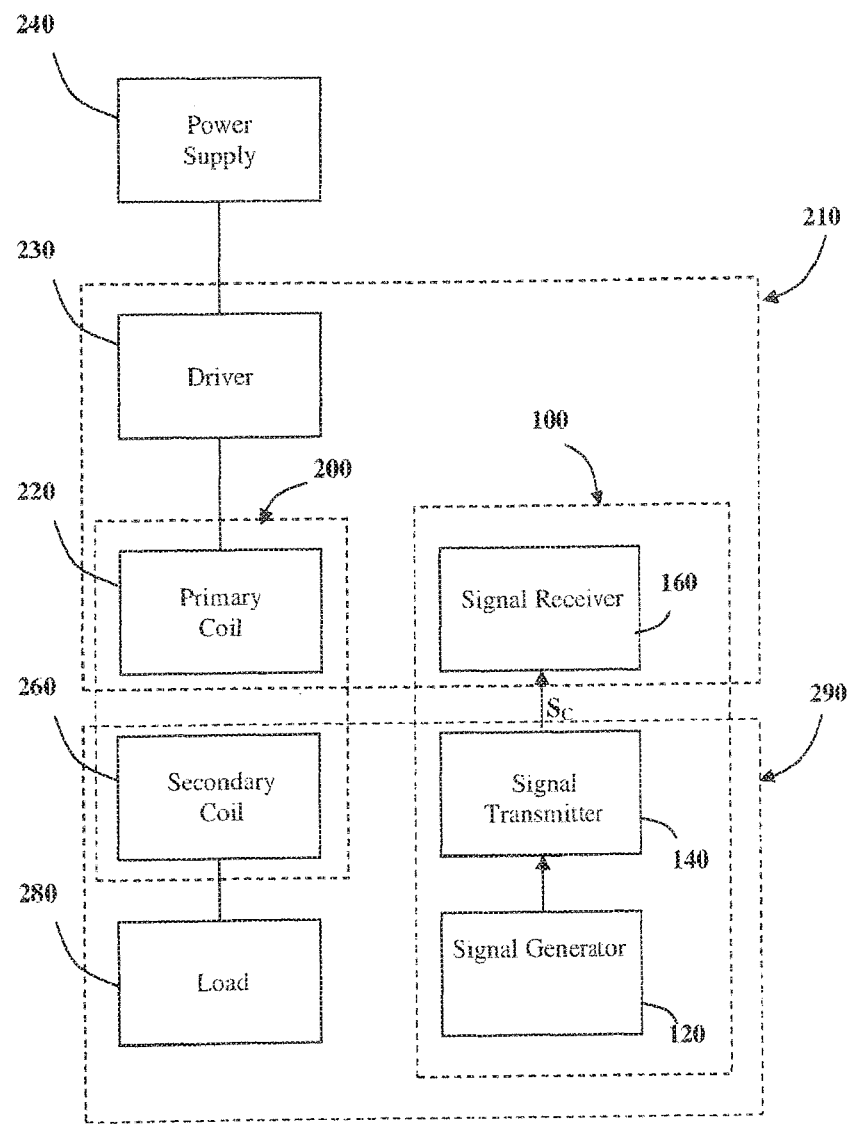
FIG. 1 is a block diagram showing the main elements of a wireless power coupling incorporating a signal transfer system according to a first embodiment of the invention.

Reference is now made to FIG. 1 showing a block diagram of the main elements of a wireless power coupling 200 incorporating a signal transfer system 100 according to a first embodiment of the invention;

The wireless power coupling 200 consists of a primary coil 220 and a secondary coil 260. The primary coil 220 is wired to a power supply 240 typically via a driver 230 which provides the electronics necessary to drive the primary coil 220. Driving electronics may include a switching unit providing a high frequency oscillating voltage supply, for example. The secondary coil 260 is wired to an electric load 280.

When the secondary coil 260 is brought into proximity with the primary coil 220, the pair of coils forms an inductive couple and power is transferred from the primary coil 220 to the secondary coil 260. In this way a power transmitter 210 may provide power to an electric device 290.

The signal transfer system 100 comprises: a signal generator 120, for generating a control signal $S_C$; a signal transmitter 140 for transmitting said control signal $S_C$; and a signal receiver 160 for receiving said control signal $S_C$.

Although in the signal transfer system 100 described herein, the signal transmitter 140 is incorporated into the power transmitter 210 and the signal receiver 160 is incorporated into the electrical device 290, it will be appreciated that a signal transmitter 140 may alternatively or additionally be incorporated into the electrical device 290 and a signal receiver 160 may alternatively or additionally be incorporated into the power transmitter 210.

The control signal $S_C$ communicates encoded data pertaining to the power transmission. This data may be pertinent to regulating efficient power transmission. Examples of such data includes parameters such as: required operating voltage, current, temperature or power for the electric load 280, the measured voltage, current, temperature or power supplied to the electric load 280 during operation, the measured voltage, current, temperature or power received by the electric load 280 during operation and the like.

In other embodiments, the control signal $S_C$ may communicate data relating to the coordinates of the primary coil 220 for the purposes of indicating the location of the power transmitter 210. Alternatively, the control signal $S_C$ may communicate data relating to the identity or presence of the electric load 280 such as the location of the secondary coil 260, or an identification code or the electric device 290 or its user.

Various signal transmitters 140 and signal receivers 160 may be used with the signal transfer system. Where the primary and secondary coils 220, 260 are galvanically isolated, for example, optocouplers may have a light emitting diode serving as a signal transmitter 140 which sends encoded optical signals over short distances to a phototransistor which serves as a signal receiver 160. Optocouplers typically need to be aligned such that there is a line-of-sight between signal transmitter and signal receiver. In systems where alignment between the signal transmitter 140 and signal receiver 160 may be problematic, optocoupling may be inappropriate and alternative systems may be preferred such as ultrasonic signals transmitted by piezoelectric elements or radio signals such as Bluetooth, WiFi, and the like. Alternatively the primary and secondary coils 220, 260 may themselves serve as the signal transmitter 140 and signal receiver 160.

Coil-to-Coil Signal Transfer

One aspect of the present embodiments relate to a signal transfer system for transferring a transmission signal regarding an electric load connectable via an inductive energy coupling to a power source. The inductive energy coupling comprises a primary coil connectable to the power source in inductive alignment with a secondary coil connectable to the electric load, the system comprises at least one ancillary load; at least one switching unit comprising a modulator for modulating a bit-rate signal with an input signal to create a modulated signal and a switch for intermittently connecting the ancillary load to the secondary coil according to the modulated signal; at least one current monitor for monitoring primary current drawn by the primary coil and producing a primary current signal, and at least one correlator for cross-correlating the primary current signal with the bit-rate signal for producing an output signal.

The switching unit preferably also comprises a controller configured to encode data into the input signal. Typically, the switching unit further comprises a frequency divider and the inductive energy coupling transfers energy with a driving frequency and the bit rate frequency is an integer fraction of the driving frequency.

The inductive energy coupling is typically a device wherein the primary coil is galvanically isolated from said secondary coil. The device may include a transformer, a DC-to-DC converter, an AC-to-DC converter, an AC-to-AC converter, a flyback transformer, a flyback converter, a full-bridge converter, a half-bridge converter, a buck converter, a boost converter, a buck-boost converter, a SEPIC converter or a zeta converter, for example.

Optionally, the input signal carries encoded data pertaining to, for example, the presence of the electric load, required operating voltage for the electric load, required operating current for the electric load, required operating temperature for the electric load, measured operating voltage for the electric load, measured operating current for the electric load, measured operating temperature for the electric load, and/or a user identification code.

In one embodiment, a contactless inductive coupling is provided, comprising the signal transfer system wherein the primary coil is embedded in a power jack and the secondary coil is embedded in a power plug galvanically isolated from the power jack.

An aspect of the technology described herein, teaches a method for transferring a signal through an inductive energy coupling, wherein the inductive energy coupling comprises a primary coil connected to a power source and a secondary coil connected to an electric load, the method comprising the following steps: providing an input signal, providing a bit-rate signal, modulating the bit-rate signal with the input signal to create a modulated signal, connecting an ancillary load to the secondary coil intermittently according to the modulated signal, monitoring a primary current drawn by the primary coil and producing a primary current signal; and cross-correlating the primary current signal with the bit-rate signal to generate an output signal.

According to another aspect, a method for regulating power transfer across a contactless inductive coupling is taught wherein the output signal provides details of power requirements of the load. Typically the input signal is provided by encoding data regarding at least one power requirement of the electric load into the input signal. Optionally and typically, the power requirement depends on parameters such as operating voltage, operating current and/or operating temperature. Alternatively the input signal is provided by monitoring at least one operating parameter of the electric load and encoding monitored parameter data into the input signal. Optionally the parameter is selected from the group comprising operating voltage, operating current and operating temperature. Typically the method for transferring a signal through an inductive energy coupling includes a preliminary step of detecting the presence of an electric load.

Figure 2A:
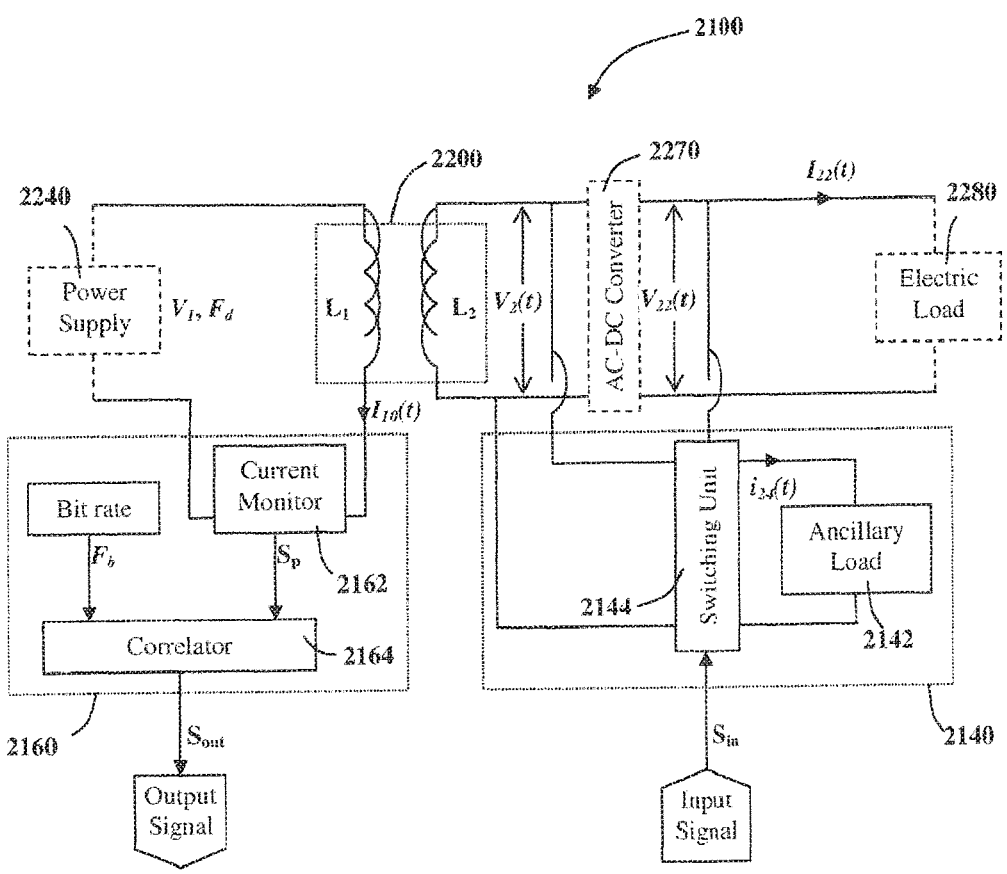
FIGS. 2a-d show another embodiment of the signal transfer system in which a control signal is transmitted through an inductive energy coupling.

Reference is now made to FIGS. 2a-d wherein a signal transfer system 2100 according to a second general embodiment of the invention is shown. With particular reference to FIG. 2a, the signal transfer system 2100 is configured to transmit a transmission signal through an inductive energy coupling 2200. The inductive energy coupling 2200 consists of a primary coil $L_1$ which may be connected to a power source 2240 and a secondary coil $L_2$, galvanically isolated therefrom, across which an electric load 2280 may be connected either directly or via an AC-DC converter 2270.

A transmission circuit 2140 may be connected in parallel with the electric load 2280. The transmission circuit 2140 comprises an ancillary load 2142 connected to the secondary coil $L_2$ via a switching unit 2144. Typically the ancillary load 2142 is much smaller than the electric load 2280.

A corresponding reception circuit 2160 is connected to the primary coil $L_1$ of the inductive energy coupling 2200 and comprises a current monitor 2162, such as an ammeter in series with the primary coil $L_1$, and a correlator 2164.

The switching unit 2144 is configured to receive an input signal $S_{in}$ and a bit-rate signal $F_b$. A modulator (not shown) modulates the bit-rate signal $F_b$ with the input signal $S_{in}$ to produce a modulated signal $S_M$. The ancillary load 2142 is intermittently connected to the secondary coil $L_2$ at a rate determined by the modulated signal $S_M$.

The power source 2240, such as an alternating-current voltage source, intermittent direct current voltage source or the like, is configured and operable to produce a primary voltage $V_1$ which oscillates at a driving frequency $F_d$. The oscillating primary voltage $V_1$ in coil $L_1$ induces a secondary voltage $V_2(t)$ in the secondary coil $L_2$. The secondary voltage $V_2(t)$ is optionally passed through an AC-DC converter 22 producing a direct-current voltage $V_{22}(t)$.

The electric load 2280 which is coupled to the secondary coil $L_2$—either directly or via the AC-DC converter 2270—draws a load current $I_{22}$. The power $P_{22}$ provided to the load 2280 is given by the scalar product of the voltage $V_{22}$ and the load current $I_{22}$. When the ancillary load 2144 is connected, an additional ancillary current $i_{24}$ is also drawn. Thus, with the ancillary load 2144 connected, the total power $P_2$ drawn by the secondary coil $L_2$ is given by:

$$P_2(t) = \overset{P}{V}_{22}(t) \cdot \left[ \overset{P}{i}_{22} + \overset{P}{i}_{24}(t) \right]$$

where the ancillary current signal $i_{24}(t)$ varies with the modulated signal $S_M$.

The input power $P_1(t)$ provided to the primary coil $L_1$ is given by:

$$P_1(t) = \overset{P}{V}_1(t) \cdot \overset{P}{I}_{10}(t)$$

where the primary voltage $V_1(t)$ oscillates at the driving frequency $F_d$ which is determined by the power supply 2240.

Input power $P_1(t)$ provided by the primary coil $L_1$ is generally proportional to the total power $P_{22}(t)$ drawn by the secondary coil $L_2$, and the primary voltage $V_1(t)$ is determined by the power supply. Perturbations in the primary current $I_{10}(t)$ supplied to the primary coil $L_1$ are thus in proportion with $i_{24}(t)$.

The current monitor 2162 monitors the primary current $I_{10}(t)$ over time, producing a primary current signal $S_p$ which typically has similar characteristics to the modulated signal $S_M$. The correlator 2164 is configured to cross-correlate the primary current signal $S_p$ with the bit rate $F_b$. The output signal $S_{out}$ of the correlator 2164 therefore has the same characteristics as the input signal $S_{in}$.

In this manner, information carried by the input signal $S_{in}$ is transmitted from the transmission circuit 2140 and is retrievable by the reception circuit 2160 from the output signal $S_{out}$. It is noted that the signal transfer system 2100 described herein, transmits a transmission signal across the same wireless power coupling 2200 as used for power transmission. This is in contradistinction to prior art transmission systems, which use additional elements to provide signal transmission channels separate from the power transmission channels. In consequence of this innovative approach, additional transmission elements such as optocouplers, piezoelectric elements, supplementary coil pairs, and the like are not generally required.

Figure 2B:
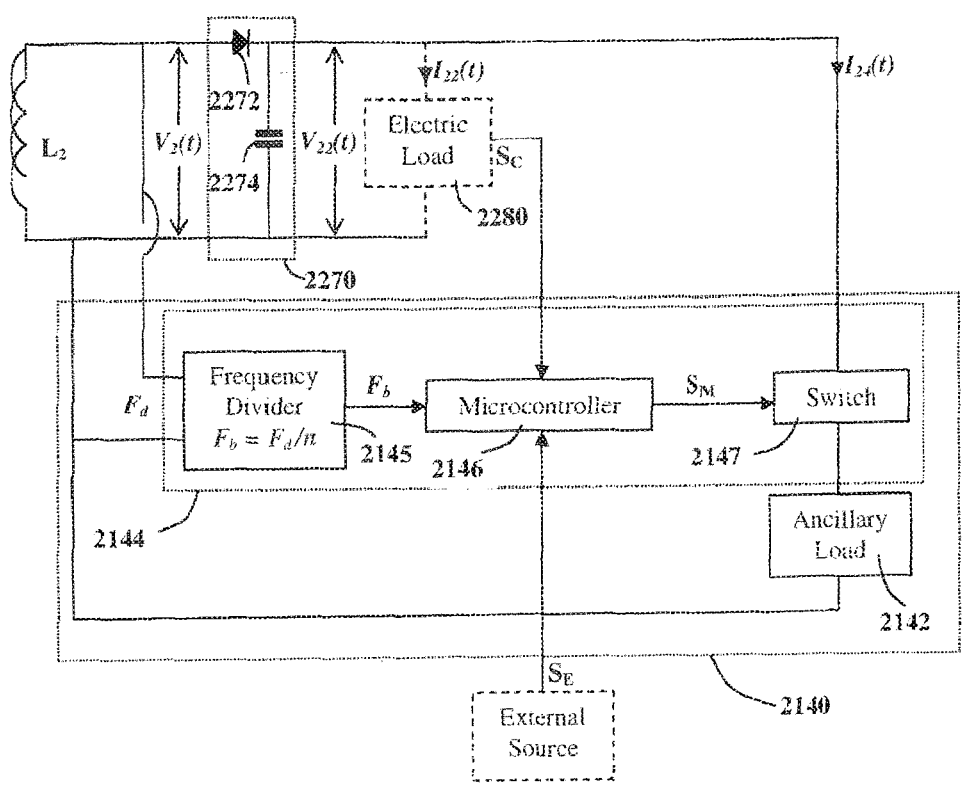

With reference now to FIG. 2b, an exemplary transmission circuit 2140 of the signal transfer system 2100 of FIG. 2a is shown. An AC-to-DC converter 2270 comprising a diode 2272 and a capacitor 2274, which is connected in parallel to the secondary coil $L_2$, converts an AC secondary voltage $V_2$ from the secondary coil $L_2$ into a DC load voltage $V_{22}$ which is connected across an electric load 2280.

The connection between the ancillary load 2142 and the load voltage $V_2$ is controlled by a switching unit 2144 which includes a frequency divider 2145, microcontroller 2146 and a switch 2147. The frequency divider 2145 provides the bit-rate signal $F_b$ which is passed to the microcontroller 2146. The microcontroller 2146 is configured to modulate the bit-rate signal $F_b$ according to input signals including control signals $S_C$ from the electric load 2280 and external signals $S_E$. as described hereinbelow.

Control signals $S_C$ may be used to regulate the power supply. Control signals $S_C$ typically provide data relating to load parameters. Typically these include the required operating voltage, current and temperature and the actual measured operating voltage, current, and temperature as monitored during operation of the load.

External Signals $S_E$ may be used to provide the transmission circuit 2140 with external data to be digitally encoded into the input signal $S_{in}$ by the microcontroller 2146 and transmitted to the reception circuit 2160. External information, may, for example, provide useful supplementary data such as a user identification code, a pass key, battery level of the load device and the like.

It will be appreciated that the ability to transmit supplementary information such as external signals $S_E$ through the inductive energy coupling 2200 presents a further advantage over prior art systems which are only suitable for transmitting control signals.

Figure 2C:
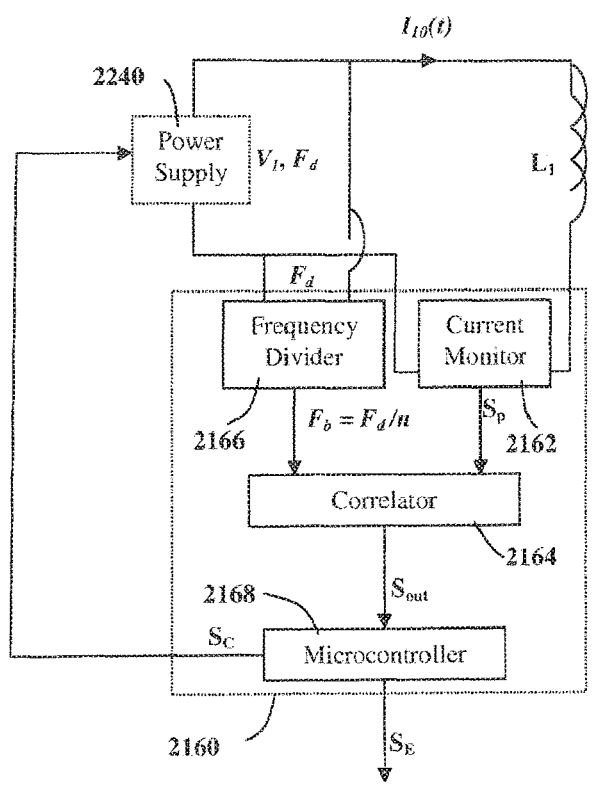

FIG. 2c shows a schematic representation of an exemplary reception circuit 2160 in accordance with the signal transfer system of FIG. 2a, consisting of a current monitor 2162, a frequency divider 2166, a correlator 2164 and a microcontroller 2168. The frequency divider 2166 provides the bit-rate signal $F_b$ which is typically an integer fraction of the driving frequency $F_d$. The current monitor 2162 provides a primary current signal $S_P$ which is passed to the correlator 2164 for cross-correlatation with the bit-rate signal $F_b$. The resulting output signal $S_{out}$ is passed to a microcontroller 2168 which may use the output signal $S_{out}$ to pass a control signal $S_C$ to control the power source 2240 so as to regulate the power provided to the electric load 2280. The microcontroller 2168 may also be used to extract external signals $S_E$ from the output signal.

Figure 2D:
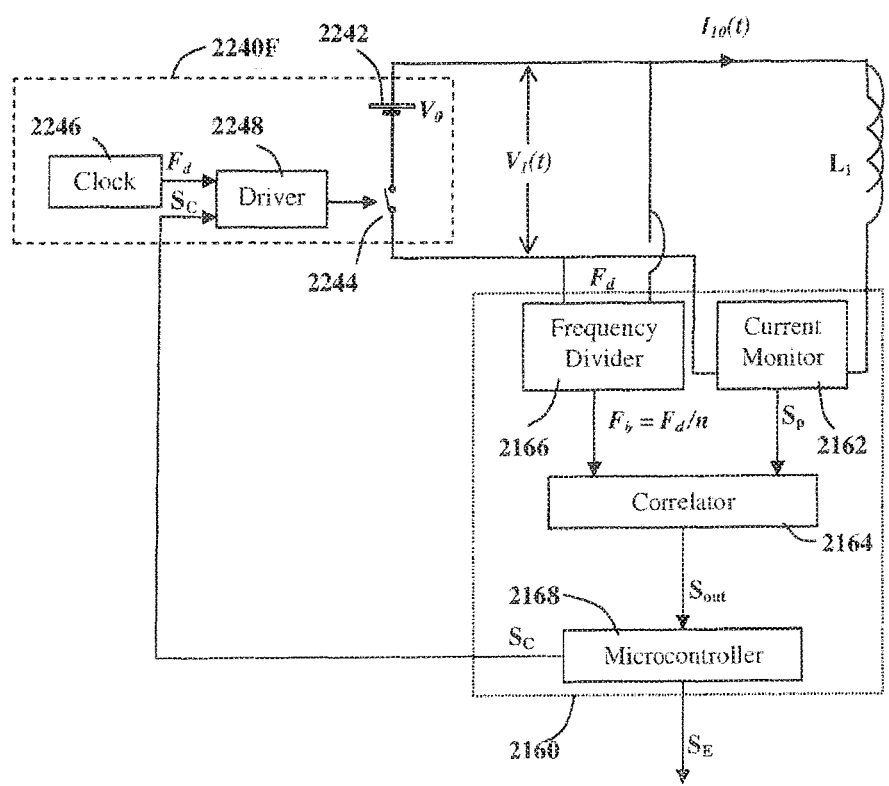

An exemplary use of the reception circuit 2160 of FIG. 2c is highlighted in FIG. 2d which shows the reception circuit 2160 configured to control a flyback power source 2240F. In a flyback converter, a direct current voltage source 2242 is intermittently connected to a primary coil $L_1$ by a switch 2244. This produces a varying voltage signal $V_1(t)$ in the primary coil $L_1$ which induces a secondary voltage $V_2$ in a secondary coil $L_2$ (FIG. 2a). The secondary coil $L_2$ is generally connected to a smoothing circuit such the AC-DC converter 2270 shown in FIG. 2b to produce a DC output.

The switch 2244 is controlled by a driver 2248 which receives a pulsing signal $F_d$ from a clock 2246. The pulsing signal $F_d$ determines the frequency with which the direct current voltage source 2242 is connected to the primary coil $L_1$. The power delivered to the primary coil $L_1$ may be regulated by varying the duty cycle of the switch 2244. The duty cycle is the proportion of the time between pulses during which the switch 2244 is closed.

FIG. 2d shows the innovative use of the signal transfer system 2100 which receives a feedback signal transferred between the primary and secondary power transmission coils and received by the reception circuit 2160. This is an improvement on prior art flyback converters, wherein additional elements such as optocouplers or the like have been used to transmit feedback signals.

The microcontroller 2168 generates a control signal $S_C$ which is relayed to the driver 2248. The control signal $S_C$ determines the duty cycle of the switch 2248 and so may be used to regulate power transmission.

Although only a flyback converter is represented in FIG. 2d, it is noted that a control signal $S_C$ thus transmitted may be used to regulate power transfer in a variety of transmission assemblies such as a transformer, a DC-to-DC converter, an AC-to-DC converter, an AC-to-AC converter, a flyback transformer, a full-bridge converter, a half-bridge converter, or a forward converter, for example.

Figure 3:
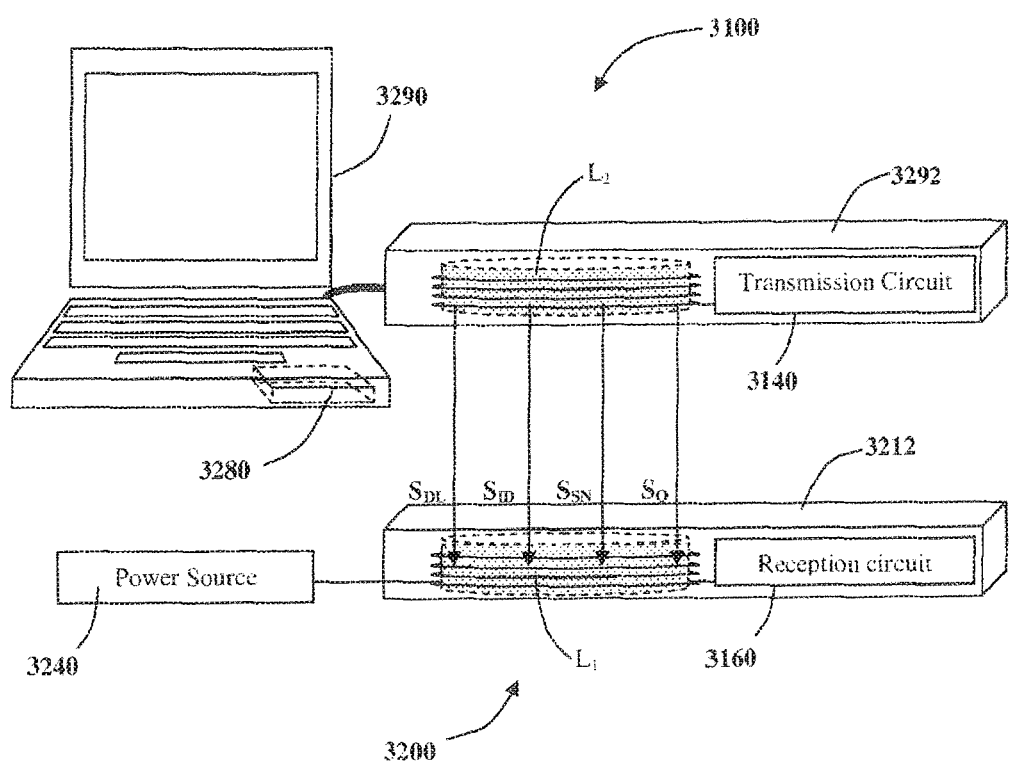
FIG. 3 is a schematic diagram showing a signal transfer system integrated into a contactless wireless power coupling system for powering a computer.

As an example of the signal transfer system 100 (FIG. 1), with reference to FIG. 3, according to a third embodiment of the invention, a signal transfer system 3100 may be integrated into a contactless wireless power coupling system 3200 where power is inductively transmitted from a jack unit 3212 to a plug unit 3292 galvanically isolated therefrom. A transmission circuit 3140 embedded in the plug unit 3292 may be used to transmit control signals $S_C$ to a reception circuit 3160 in the jack 3212. Thus, once the primary $L_1$ and secondary $L_2$ coils are aligned, control signals may be passed between the plug 3292 and jack 3212 units with no need to align additional components such as optocouplers, and the like.

Where a contactless plug 3292 is used, for example, to power a portable computer 3290 having on-board power cells 3280, the signal transfer system 3100 may be used to detect the presence of the load 3290 producing a detection signal $S_{DL}$ and then to provide the jack 3212 with signals relating to the identity of the user $S_{ID}$ and the serial number $S_{SN}$ or other identifier of the laptop computer 3290. Signals regarding the operating voltage and current required by the PC may be provided as a regulatory signal $S_Q$ which may also provide supplementary information such as information related to the power level of the cells 3280, for example.

Using this signal $S_Q$, the signal transfer system 3100 may be used to select between powering the computer 3290 directly, recharging the power cells 3280 thereof, or both powering and recharging, depending on defaults and predetermined criteria. It is further noted that when used for recharging cells 3280, the ability to monitor the temperature of the cells 3280 during recharging may be used to prevent overheating.

Figure 4:
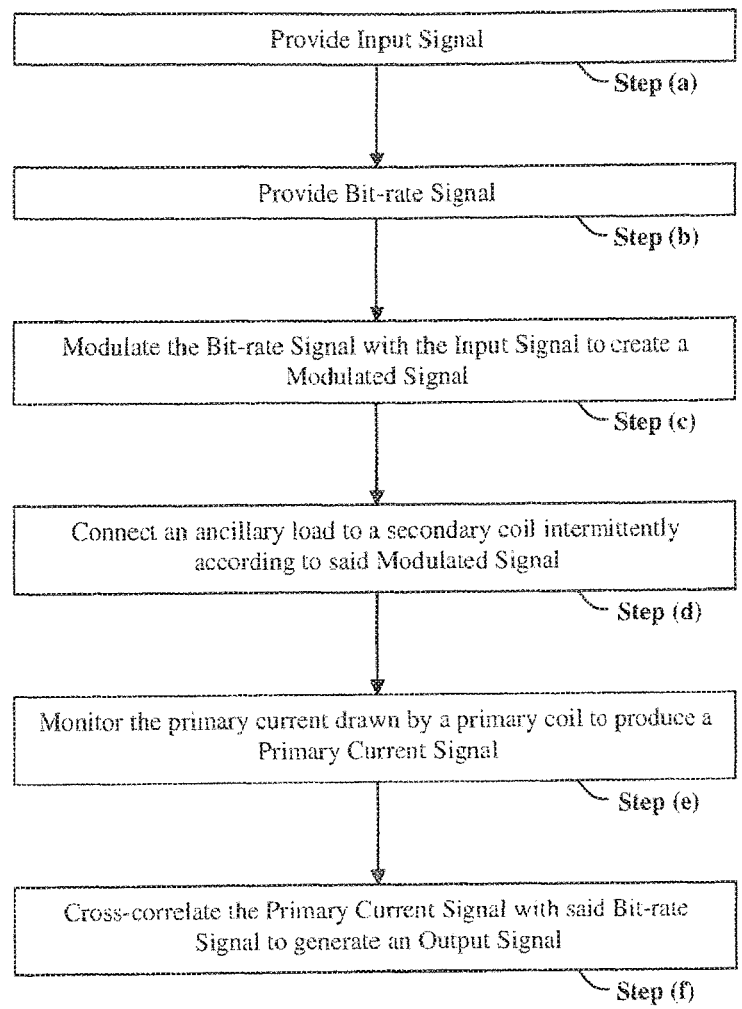
FIG. 4 is a flowchart showing a method for transferring a transmission signal through an inductive energy coupling in accordance with the invention.

Referring to FIG. 4, a flowchart showing a method for transferring a transmission signal through an inductive energy coupling in accordance with another embodiment of the invention is presented. With further reference to FIG. 2a, an Input Signal $S_{in}$—Step (a) and a Bit-rate Signal $F_b$—Step (b) are provided to the transmission circuit 2140. The Bit-rate Signal $F_b$ is then modulated by the Input Signal $S_{in}$, producing a Modulated Signal $S_M$—Step (c). An ancillary load 2142 is then connected to the second coil $L_2$ intermittently according to the Modulated Signal $S_M$—Step (e). The reception circuit 2160 monitors the primary current drawn by the primary coil $L_1$ to produce a Primary Current Signal $S_P$—Step (e). This Primary Current Signal $S_P$ is then cross-correlated with the Bit-rate Signal $F_b$ to generate an Output Signal $S_{out}$—Step (f).

The basic signal transfer system and method described hereinabove are capable of variation. For example, it will be appreciated that through the use of such a system, information regarding a load 2280 may be transmitted to the power transmitter 2210 across the inductor coils $L_1$ and $L_2$ of the inductive coupling 2200, as a signal superimposed on the power transmitted, without requiring additional data transmitting components.

Power Coupling Efficiency

Embodiments of the invention are directed to providing methods for monitoring the efficiency of power transmission by a wireless power transmitter comprising at least one primary coil wired to a power supply, for inductively coupling with a secondary coil wired to an electric device. The method comprises the steps of: measuring the input power delivered to the primary coil, measuring the output power received by the electric device, communicating the input power to a processor, communicating the output power to the processor and the processor determining an index of power-loss.

In one specific application, the index of power-loss is an efficiency quotient Q, being the ratio of the output power to the input power, and the method comprises the further step of: disconnecting the primary coil from the power supply if the efficiency quotient Q is below a threshold value. Typically the threshold efficiency quotient is in the range of from 75% to 95%.

In another application, the index of power-loss is an efficiency differential Δ, being the difference between the output power to the input power, and the method comprises the further step of: disconnecting the primary coil from the power supply if the efficiency differential Δ is above a threshold value.

A further aspect of the technology described herein relates to an efficiency monitor for monitoring the efficiency of power transmission by a wireless power transmitter of the type including at least one primary coil wired to a power supply, for inductively coupling with a secondary coil wired to an electric device. The efficiency monitor includes: at least one input power monitor for measuring the input power delivered to the primary coil; at least one output power monitor for measuring the output power received by the secondary coil; at least one processor for determining an index of power-loss; and at least one communication channel for communicating the input power and the output power to the processor.

Typically the efficiency monitor also includes at least one circuit-breaker for disconnecting the primary coil from the power supply. Preferably the input power monitor is incorporated within the power transmitter and the output power monitor is incorporated within the electric device.

Optionally, the electric device comprises at least one signal transmitter for transmitting the output power to a signal receiver incorporated in the wireless power transmitter. The signal transmitter may include one or more light emitting diodes, radio transmitters, optocouplers, or ancillary load transmitter circuits, for example.

According to preferred embodiments, the efficiency monitor includes one or more hazard detectors in communication with the processor. Such hazard detectors may include magnetic sensors, heat sensors, electromagnetic radiation sensors and Hall probes, for example.

Figure 5:
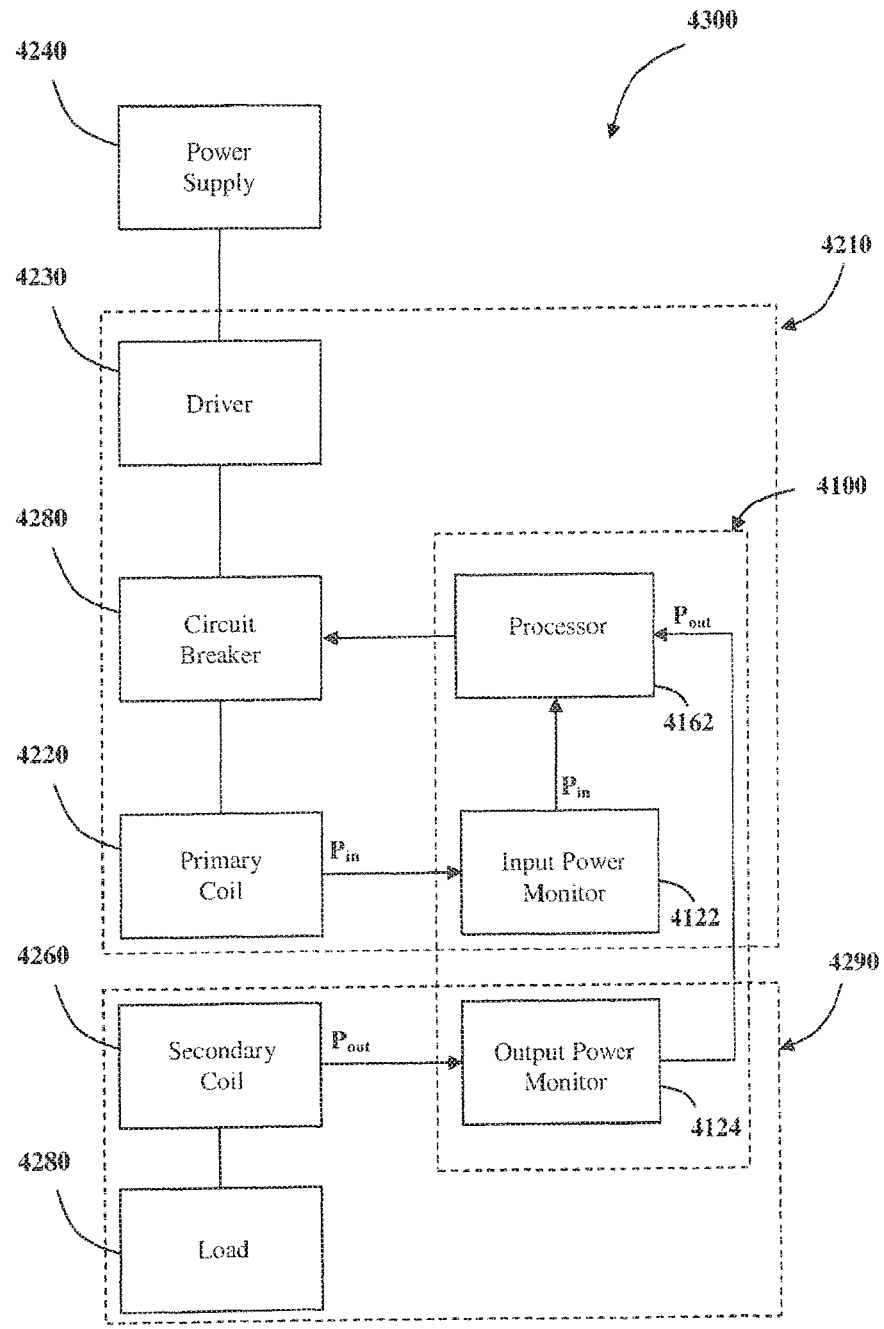
FIG. 5 is a block diagram representing another embodiment of the signal transfer system incorporated into an efficiency monitor for monitoring the efficiency of power transmission by a wireless power transmitter.

Reference is now made to FIG. 5 showing a block diagram of a signal transfer system 4100. The signal transfer system 4100 is incorporated into an efficiency monitor 4300 for monitoring the efficiency of power transmission by a wireless power transmitter 4210.

The wireless power transmitter 4210 consists of a primary coil 4220 wired to a power supply 4240 via a driver 4230 which provides the electronics necessary to drive the primary coil 4220. Driving electronics may include a switching unit providing a high frequency oscillating voltage supply, for example.

If a secondary coil 4260 is brought into proximity with the primary coil 4220, the pair of coils forms an inductive couple, and power is transferred from the primary coil 4220 to the secondary coil 4260. In this way the power transmitter 4210 may provide power to an electric device 4262 comprising an electric load 4280 wired in series with the secondary coil 4260.

The efficiency monitor 4300 consists of an input power monitor 4122 incorporated within the power transmitter 4210 and an output power monitor 4124 incorporated within the electric device 4290, both in communication with a processor 4162.

The input power monitor 4122 is configured to measure the input power $P_{in}$ provided by the primary coil 4220 and communicates this value to the processor 4162. The output power monitor 4124 is configured to measure the output power $P_{out}$ received by the secondary coil 4260 and communicates this value to the processor 4162.

The processor 4162 is configured to receive the values of the input power $P_{in}$ and the output power $P_{out}$ and to calculate an index of power-loss. The index of power loss indicates how much power is leaking from the inductive couple. The index of power-loss may be the efficiency quotient Q which is the ratio between them, $P_{out}/P_{in}$, which is an indication of the efficiency of the inductive coupling. Alternatively, the index of power loss may be the efficiency differential Δ which is the difference between $P_{out}$ and $P_{in}$.

The processor 4162 may additionally or alternatively be configured to trigger a circuit-breaker 4280 thereby cutting off the primary coil 4220 from the power supply 4240 when the efficiency quotient Q falls below a predetermined threshold or the efficiency differential Δ rises above a predetermined threshold. Typically, this predetermined threshold for the efficiency quotient Q is in the range of from about 75% to 95%, and more preferably about 85%.

Figure 6A:
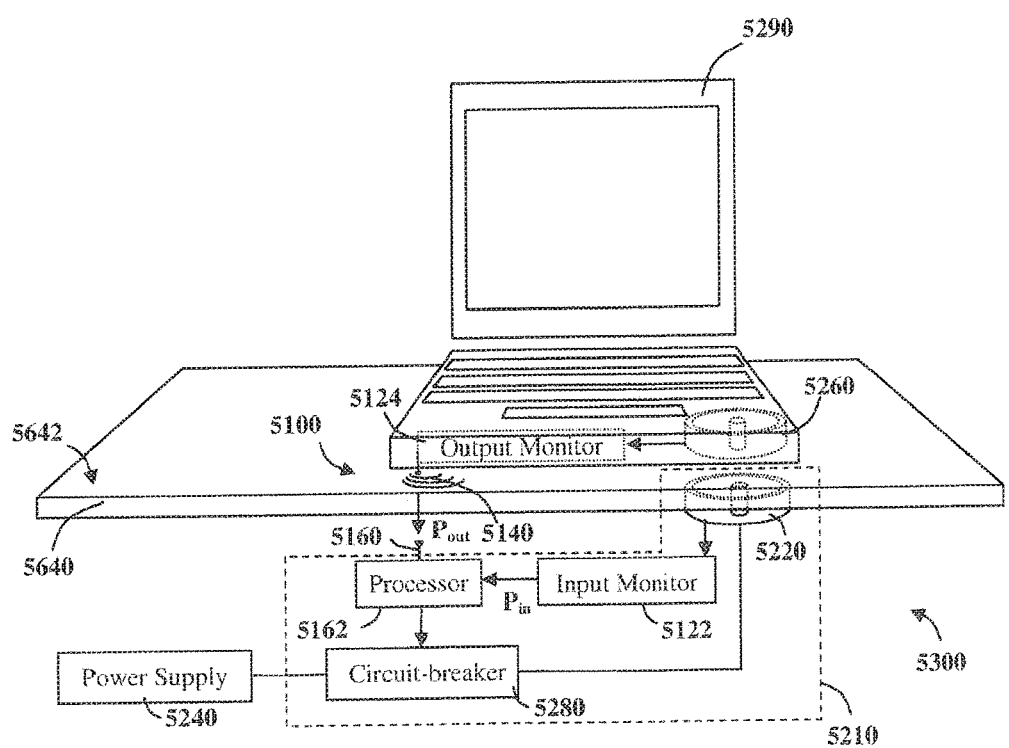
FIG. 6a is a schematic diagram of a wireless power transmitter with an electrical load inductively coupled thereto, monitored by an efficiency monitor.

With reference to FIG. 6a, an efficiency monitor 5300 for a wireless power transmitter 5210 is shown. wireless power transmitter 5210 consists of a primary coil 5220 wired to a power source 5240 via an efficiency monitor 5300 all concealed behind a facing layer 5642 of a horizontal platform 5640 such as a desk-top, a kitchen work-top, a conference table or a work bench. The facing layer may be a sheet of self-adhesive plastic film, plastic, vinyl, Formica, or wood veneer, for example.

In other embodiments a primary coil 5220 may be concealed beneath or within flooring such as rugs, fitted carpet, parquet, linoleum, floor tiles, tiling, paving, and the like. Alternatively the primary coil 5220 may be concealed behind or within a vertical surface such as a wall of a building or a cabinet, for example, behind wallpaper or stretched canvas or the like.

The primary coil 5220 may be used to power an electrical device 5290 such as a computer wired to a secondary coil 5260. The electrical device 5290 is placed upon the surface 5642 of a platform 5640 such that the secondary coil 5260 is aligned with the primary coil 5220 therebeneath.

The efficiency of the power transmitter 5210 is monitored by an efficiency monitor 5300. An input power monitor 5122 is incorporated within the power transmitter 5210 behind the platform 5640 and is in direct conductive communication with a processor 5162. An output power monitor 5124 is incorporated within the electrical device 5290 and is not physically connected to the power transmitter 5210. The output power monitor 5124 communicates with the processor 5162 via a signal transfer system 5100 comprising a signal transmitter 5140 incorporated within the electrical device 5290 which is configured to transmit a signal to a signal receiver 5160 incorporated within the power transmitter 5210.

The signal transmitter 5140 may be a standard signal transmitter such as those widely used in computing and telecommunications, such as an Infra-red, Wi-fi, or Bluetooth transmitter or the like. Indeed, any light emitting diodes, radio transmitters, optocouplers, or other such transmitters of radiation for which the platform 5640 is translucent may be used. Alternatively, a fiber optic pathway may be provided through the platform.

In certain embodiments, an optical transmitter, such as a light emitting diode (LED), for example, is incorporated within the power transmitter 5210 and is configured and operable to transmit electromagnetic radiation of a type and intensity capable of penetrating the casing of the electrical device 5290, and the surface layer 5642. An optical receiver, such as a photodiode, a phototransistor, a light dependent resistors, or the like, is incorporated within the primary unit for receiving the electromagnetic radiation transmitted through the surface layer 5642.

It is noted that many materials are partially translucent to infra-red light. It has been found that relatively low intensity infra red signals from LEDs and the like, penetrate several hundred microns of common materials such as plastic, cardboard, Formica, or paper sheet, to a sufficient degree that an optical receiver, such as a photodiode, a phototransistor, a light dependent resistors, or the like, behind a sheet of from 0.1 mm to 2 mm of such materials, can receive and process the signal. For example, a signal from an Avago HSDL-4420 LED transmitting at 850 nm over 24 degrees, may be detected by an Everlight PD15-22C-TR8 NPN photodiode, from behind a 0.8 mm Formica sheet. For signalling purposes, a high degree of attenuation may be tolerated, and penetration of only a small fraction, say 0.1% of the transmitted signal intensity, may be sufficient. Thus, an infra-red signal may be used to provide a communication channel between primary and secondary units galvanically isolated from each other by a few hundred microns of wood, plastic, Formica, wood veneer, glass, or the like.

The signal transmitter 5140 and signal receiver 5160 may be laterally displaced from the primary coil 5220 and secondary coil 5260. In preferred embodiments, however, the signal transmitter 5140 is located at the center of the secondary coil 5260, and the signal receiver 5160 is located at the center of the primary coil 5220. This permits alignment to be maintained through 360 degree rotation of the secondary coil 5260 relative to the primary coil 5220.

The processor 5162 is configured to receive the values of the input power $P_{in}$, directly from the input power monitor 5122, and the output power $P_{out}$, via the signal receiver 5160. The processor 5162 then calculates the efficiency quotient Q. In normal usage as represented in FIG. 6a, the processor records an efficiency quotient Q higher than a predetermined threshold so power transmission continues uninterrupted. When the efficiency quotient Q falls below a predetermined threshold, this indicates that power is being drawn from the primary coil 5220 by some power drain other than the secondary coil 5260.

Figure 6B:
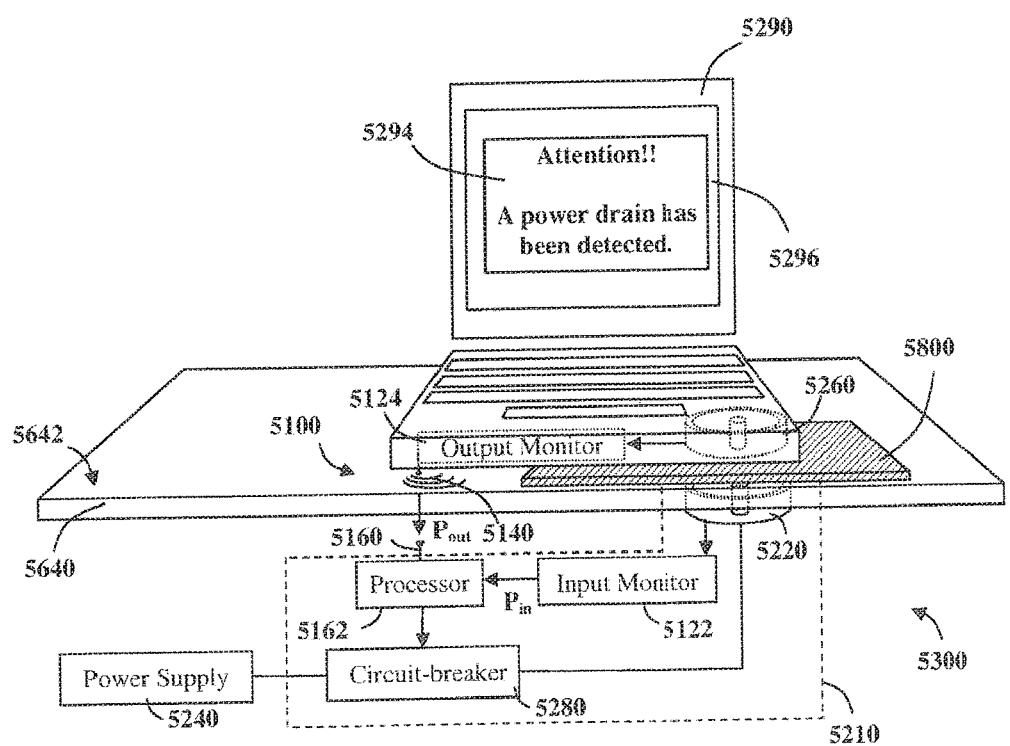
FIG. 6b is a schematic diagram of the wireless power transmitter of FIG. 6a wherein a power drain has been introduced between the primary and secondary coils.

FIG. 6b is a schematic diagram of the wireless power transmitter 5210 of FIG. 6a wherein a power drain such as a conductive sheet of metallic foil 5800 is introduced between the primary coil 5220 and the secondary coil 5260. The oscillating magnetic field produced by the primary coil 5220 when connected to a high frequency oscillating voltage from a driver 5230, produces eddy currents in the conductive sheet 5800 thereby heating the conductive sheet and draining power from the primary coil 5220. Such a power drain may be wasteful and/or dangerous. It will be appreciated that leak prevention systems which cut off power to the primary coil 5220 if no secondary coil 5260 is coupled thereto, would fail to detect this hazard.

In contradistinction to previous systems known to the inventors, embodiments of the present invention measure the efficiency quotient Q. Consequently, when a power drain is introduced, such as that shown in FIG. 6b, for example, the output power $P_{out}$ received by the secondary coil 5260 is lower than normal and the efficiency quotient Q may therefore drop below the predetermined threshold. The efficiency monitor 5300 is thus able to detect the hazard.

According to certain embodiments, additional detectors (not shown) may be incorporated within the power transmitter 5210, the platform 5640, or the electrical device 5290 for monitoring other scientific effects which may be indications of possible hazards such as the magnetic field generated by the primary coil 5220, or the temperature of the platform 5640, for example. Such detectors may function in accordance with one or more of a variety of principles, including, inter alia, magnetic sensing means, Hall probes, heat sensors, or electromagnetic sensors.

The processor 5162 may assess the level of the hazard detected by processing the various signals received according to a predetermined logical sequence. If necessary, the processor 5162 may trigger a circuit-breaker 5280 thereby cutting off the primary coil 5220 from the power supply 5240. Depending on the nature of the hazard, the processor 5162 may additionally or alternatively alert a user to the hazard. The alert may be a visual or audio alarm, for example, such as a buzzer or light incorporated in the power transmission surface, or a signal sent to the computer 5290 which displays a warning 5294 on its visual display 5296 or emits a warning sound.

In preferred embodiments the output power $P_{out}$ may be monitored and encoded into the input signal $S_{in}$. The coil-to-coil signal generator shown in FIG. 2a may be used to transmit the input signal $S_{in}$ from a transmission circuit 2140 (FIG. 2a) incorporated within an electrical device 290 (FIG. 1) and is retrievable by the reception circuit 2160 (FIG. 2a) incorporated within the power transmitter 210 (FIG. 1) from the output signal $S_{out}$. The retrieved signal may then be communicated to a processor which uses it to calculate the efficiency quotient Q.

Figure 7:
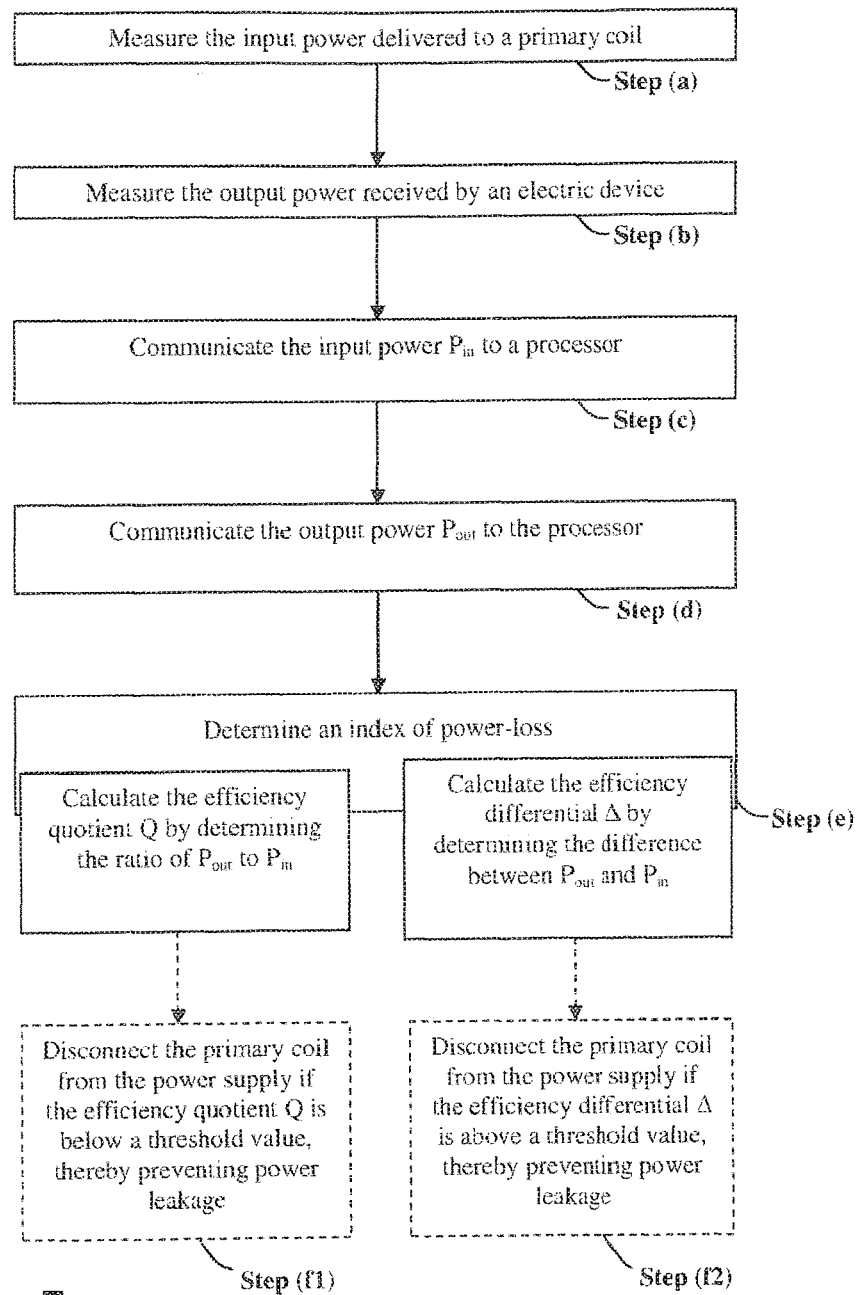
FIG. 7 is a flow diagram of a method for using the signal transfer system to monitor the efficiency of power transmission by a wireless power transmitter.

Reference is now made to FIG. 7 showing a flow diagram of a method for monitoring the efficiency of power transmission by a wireless power transmitter according to a further embodiment of the present invention. The method includes the following steps:

a) measuring the input power delivered to a primary coil;
b) measuring the output power received by an electric device;
c) communicating the input power $P_{in}$ to a processor;
d) communicating the output power $P_{out}$ to the processor;
e) determining an index of power-loss, such as an efficiency quotient Q or efficiency differential Δ;
f) optionally, disconnecting the primary coil from the power supply, for example if the efficiency quotient Q is below a threshold value (f1) or the efficiency differential Δ is above a threshold value (f2), thereby preventing power leakage.

Figure 8:
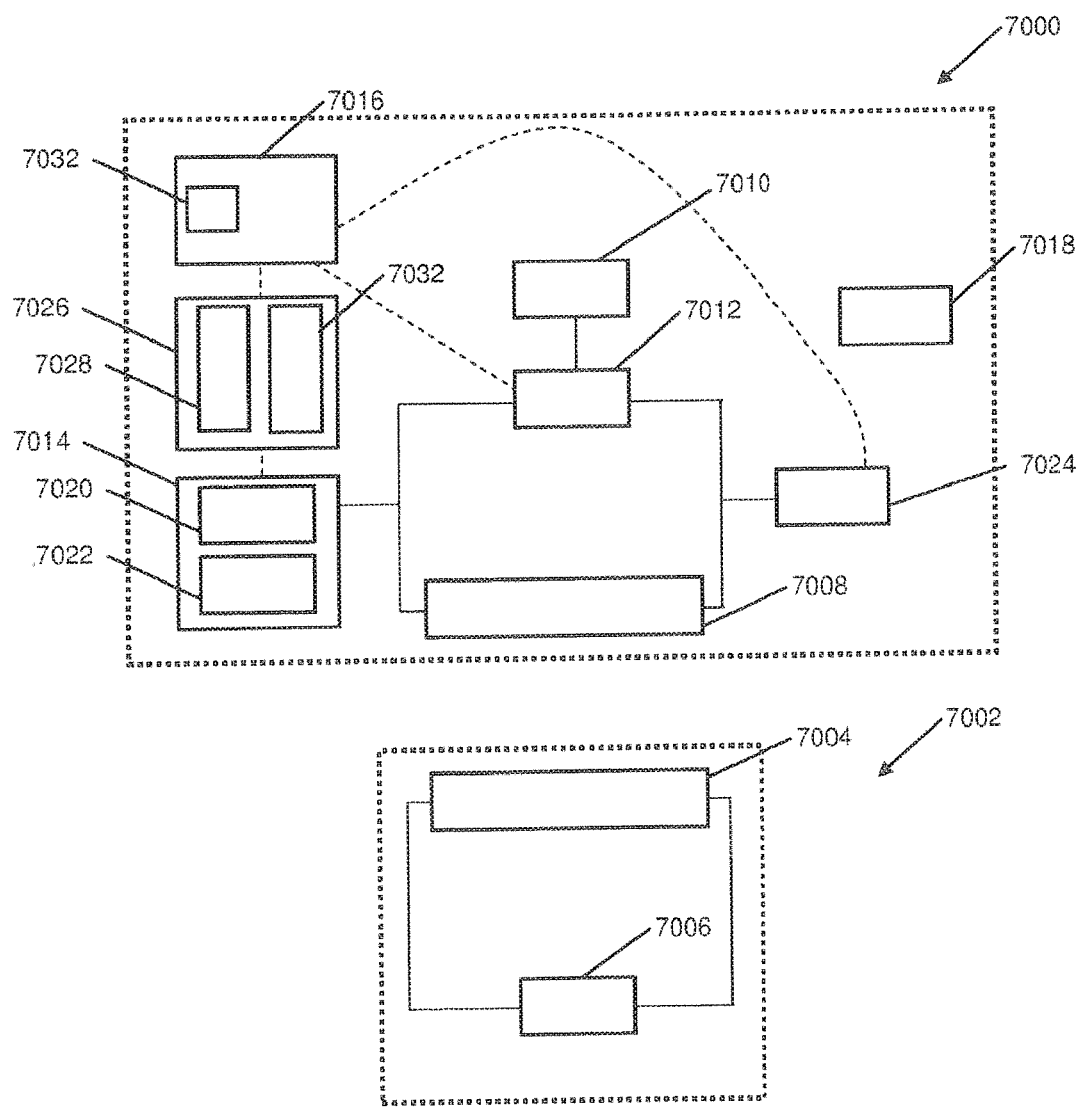
FIG. 8 is a block diagram showing the main elements of a wireless power transmitter and an associated wireless power receiver.

As illustrated in FIG. 8, a wireless power transmitter, which is generally indicated at 7000, is provided. The wireless power transmitter 7000 is configured to transmit power (e.g., electrical power) inductively to a wireless power receiver 7002, which comprises a secondary coil 7004 connected to a load 7006.

The wireless power transmitter 7000 comprises a primary coil 7008, a power supply 7010 and an associated driver 7012, a monitoring system 7014, a controller 7016, and one or more memory modules 7018, which may comprise at least one of volatile and non-volatile memory.

The primary coil 7008 is configured to be inductively, loosely, tightly, remotely coupled, or otherwise associated with the secondary coil 7004 for transmitting power thereto, according to any suitable method, many which are well-known in the art.

The driver 7012 is configured to provide a varying electric potential from the power supply 7010 to the primary coil 7008.

The monitoring system 7014 is configured to measure (directly or indirectly) electrical flow parameters of the primary coil 7008. The electrical flow parameters may include the voltage and/or current across the primary coil 7008. As such, the monitoring system 7014 may comprise a voltage monitor 7020 configured to measure the voltage across the primary coil 7008, and a current monitor 7022 configured to measure the current across the primary coil. It will be noted that while the voltage and current monitors 7020, 7022 are illustrated schematically as being distinct element, a single element may be provided which performs the functions of both without departing from the scope of the present disclosure, *mutatis mutandis*.

The controller 7016, which may comprise or be constituted by a microcontroller, is configured to detect, based on the electrical flow parameters measured by the monitoring system 7014, an error condition. The error condition may be indicative of a foreign object introduced between the primary coil and the secondary coil, which affects the relationship among at least some of the electrical flow parameters. The controller 7016 is configured to facilitate interrupting the electrical potential to the primary coil, for example, when the error condition is detected.

It will be appreciated that while FIG. 8 illustrates control relationships (in broken lines) between the controller 7016 and other elements of the wireless power transmitter 7000, these are by way of illustration only and are non-limiting. One skilled in the art will recognize that other control relationships may exist, and those shown may not exist in practice, *mutatis mutandis*.

The electrical potential may be interrupted in any convenient fashion. According to some examples, the controller 7016 may direct the power supply 7010 and/or driver 7012 to stop the supply of power. According to other examples, the wireless power transmitter 7000 may comprise a circuit breaker 7024, which is configured to selectively connect/disconnect the power supply 7010 to/from the primary coil 7008. This may be useful, for example, when a single power supply 7010 is used to simultaneously provide power to multiple primary coils 7008, thereby allowing the electrical potential to each primary coil to be interrupted without affecting the supply to the other ones.

In addition, a signal conditioner 7026 may be provided, downstream of the monitoring system 7014, configured to produce a signal from which an error condition may be more easily detected. For example, it may comprise a frequency changer 7028 configured to increase the frequency of an output signal of the monitoring system. Furthermore, it may comprise a filter 7030, such as a Butterworth filter, configured to reduce noise of the output signal.

The controller 7016 may be configured to carry out one of one or more methods to detect an error condition. In order to accomplish this, e.g., reference parameters, indicative of either an error condition or of a non-error condition, are compared to values measured by the monitoring system 7014. In order to facilitate this, the controller 7016 may comprise a comparator 7032.

According to some examples, the controller 7016 is configured to calculate reference parameters of one or more of the electrical flow parameters. The frequency of the input signal, i.e., of the electric potential provided by the driver 7012, may also be taken into account when calculating the reference parameters. According to other examples, reference parameters used by the controller 7016 are provided in advance, e.g., stored in the volatile or non-volatile memory of the memory module 7018.

Figure 9:
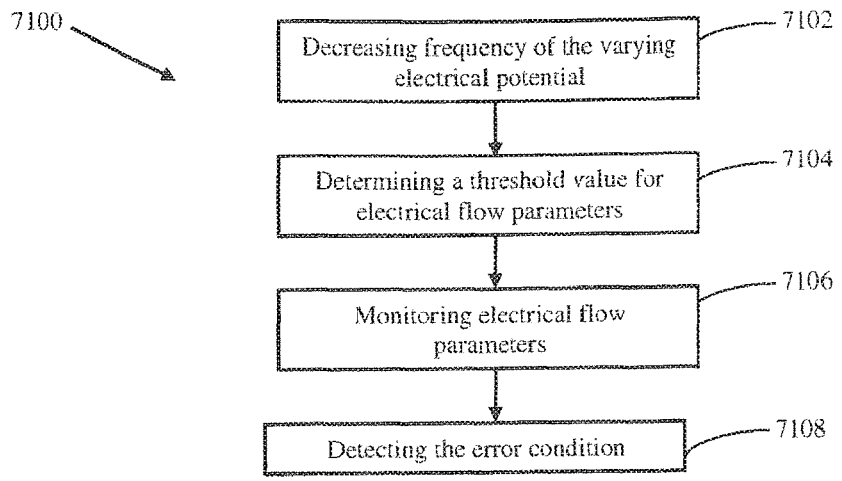
FIGS. 9 through 11 are flow diagram illustrating different foreign object tests performed by the wireless power transmitter illustrated in FIG. 8.

The wireless power transmitter 7000 may be configured to perform one or more type of foreign object tests to detect an error condition. As illustrated in FIG. 9, a startup foreign object test, generally indicated at 7100, may be performed as follows (it will be appreciated that while elements of the wireless power transmitter which perform some of the steps are listed, it is by way of example only, and some of the steps may be performed by elements other than those listed without departing from the scope of the presently disclosed subject matter, *mutatis mutandis*):

In step 7102, the frequency of the varying electrical potential through a plurality of frequencies from a first frequency to a second frequency is decreased.

In step 7104, the controller 7016 determines a threshold value for each of one or more of the electrical flow parameters (for example the voltage and current across the primary coil 7008) for at least some of the plurality of frequencies, the threshold values corresponding to non-error conditions and constituting one of the reference parameters.

In step 7106, the monitoring system 7014 monitors the electrical flow parameters.

In step 7108, the error condition is detected by the controller 7016 if one or more of the electrical flow parameters exceeds the threshold value.

Startup foreign object test 7100 may be particularly useful, for example, when charging is initiated, i.e., during a so-called "soft start".

Figure 10:
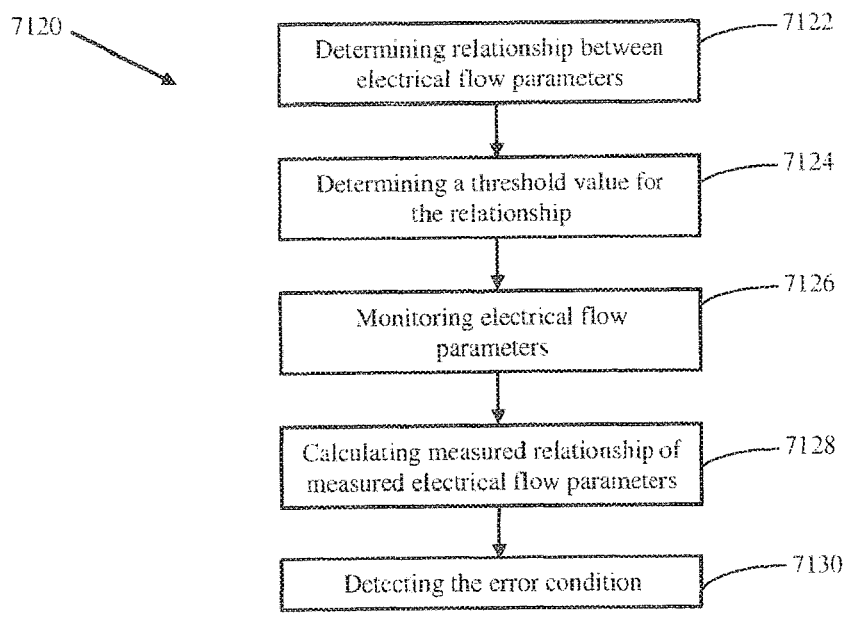

As illustrated in FIG. 10, a transmission foreign object test, generally indicated at 7120, may be performed as follows (it will be appreciated that while elements of the wireless power transmitter which perform some of the steps are listed, it is by way of example only, and some of the steps may be performed by elements other than those listed without departing from the scope of the presently disclosed subject matter, *mutatis mutandis*):

In step 7122, a relationship between two or more of the electrical flow parameters is determined. The relationship may be based on at least the voltage and current across the primary coil. The relationship may be further based on the frequency of the varying electrical potential.

In step 7124, a threshold value for the relationship, corresponding to a non-error condition and constituting the reference parameters, is determined.

In step 7126, the monitoring system monitors the electrical flow parameters.

In step 7128, a measured relationship of the measured electrical flow parameters is calculated.

In step 7130, the error condition is detected if the measured relationship is beyond the threshold value.

The detection in step 7130 is based on the finding that the ratio between peak DC voltage and the current is always above a certain threshold value in the case of an error condition (i.e., if there is a foreign object between the wireless power transmitter and the wireless power receiver), and below it when an error condition does not exist. This relationship may take the driving frequency of the varying electric potential into account.

Figure 11:
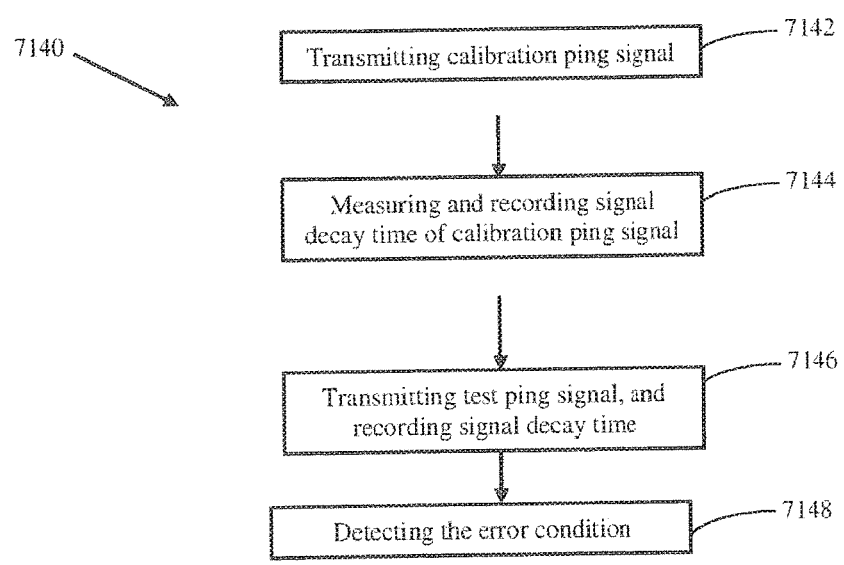

As illustrated in FIG. 11, an idle foreign object test, generally indicated at 7140, may be performed as follows (it will be appreciated that while elements of the wireless power transmitter which perform some of the steps are listed, it is by way of example only, and some of the steps may be performed by elements other than those listed without departing from the scope of the presently disclosed subject matter, *mutatis mutandis*):

In step 7142, a calibration ping signal is transmitted at a time when it is known that the error condition does not exist. This may be done, for example, during manufacture.

In step 7144, the signal decay time of the calibration ping signal is measured and recorded, for example, in non-volatile memory of the memory module 7018.

In step 7146, a test ping signal is transmitted, and the signal decay time thereof is recorded.

In step 7148, an error condition is detected if the signal decay time of the test ping signal is below the signal decay time of the calibration ping signal, beyond a predetermined threshold.

It will be appreciated that the signal decay time may be obtained in any suitable fashion without departing from the scope of the presently disclosed subject matter, *mutatis mutandis*. For example, it may be transmitted thereto from an external source, for example, taking into account environment conditions (parameters of a charging surface, etc.)

The foreign object test 7140 may be modified by recording the peak voltage and/or current during a ping, *mutatis mutandis*. In this respect, it will be appreciated that a small electric potential may be provided to the primary coil 7008 for the purpose of the foreign object test 7140 is necessary.

It is further noted that perturbations in the self-resonance of the system may indicate the presence of a foreign body. Accordingly, self-resonance of the system may be determined at intervals such that any perturbations may be detected indicating the possible presence of such foreign objects.

The idle foreign object test 7140 may be particularly useful, for example, when the wireless power transmitter is in an idle state, i.e., while it is not engaged in power transfer.

Figure 12:
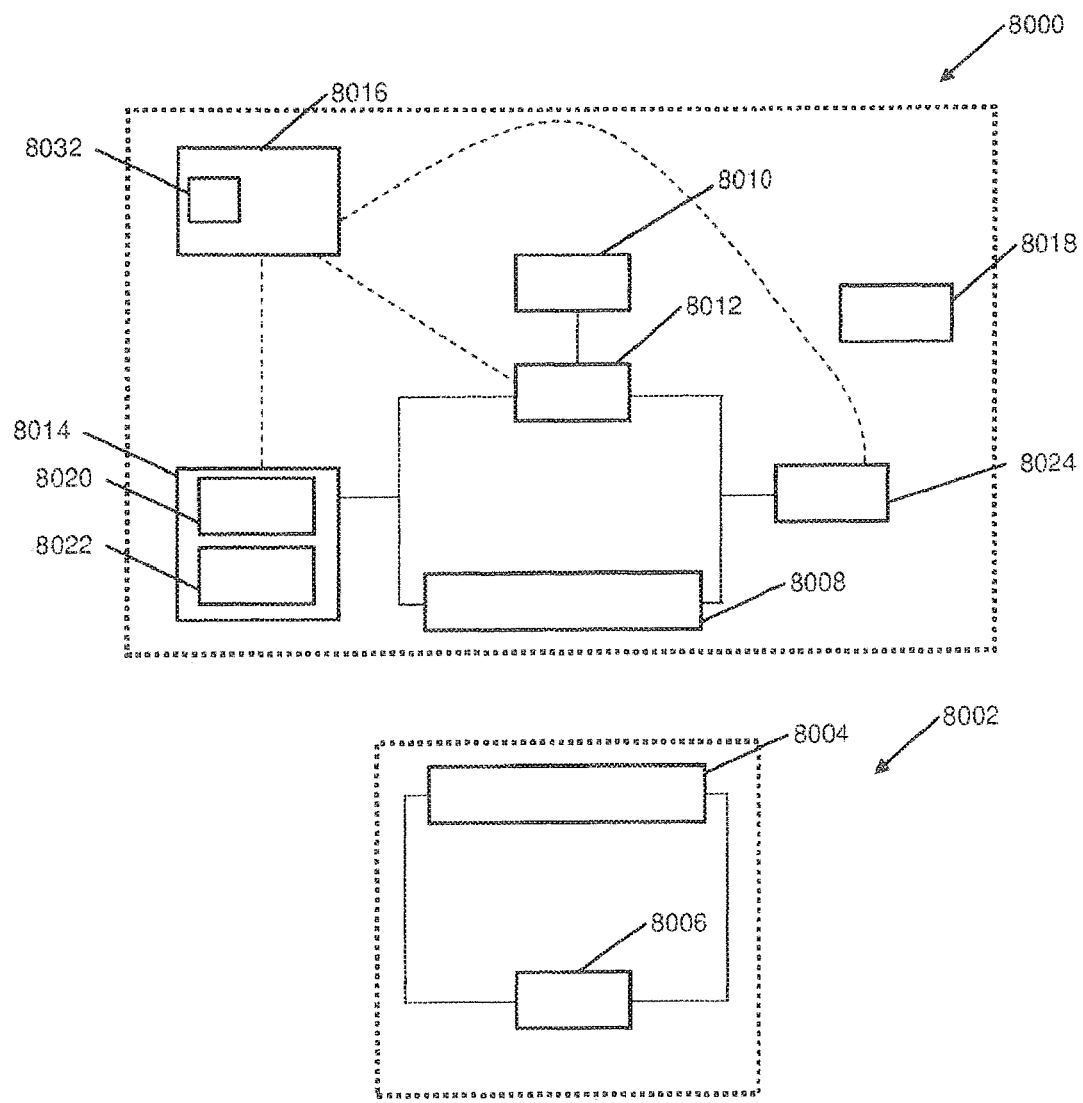
FIG. 12 is a block diagram showing the main elements of another example of a wireless power transmitter and an associated wireless power receiver.

With regard to detection of perturbations in the self-resonance of the system, as illustrated in FIG. 12, another example of a wireless power transmitter, which is generally indicated at 8000, is provided. The wireless power transmitter 8000 is configured to transmit power (e.g., electrical power) inductively or otherwise wirelessly to a wireless power receiver 8002, which comprises a secondary coil 8004 connected to a load 8006.

The wireless power transmitter 8000 comprises a primary coil 8008, a power supply 8010 and an associated driver 8012, a monitoring system 8014, a controller 8016, and one or more memory modules 8018, which may comprise at least one of volatile and non-volatile memory.

The primary coil 8008 is configured to be inductively coupled to the secondary coil 8004 thereby forming an inductive couple therewith, or to otherwise to transfer power thereto according to any suitable method, many which are well-known in the art.

The driver 8012 is configured to provide a varying electric potential from the power supply 8010 to the primary coil 8008. The electrical potential may vary, e.g., based on feedback from the secondary coil 8004.

The monitoring system 8014 is configured to measure (directly or indirectly) electrical flow parameters of the primary coil 8008. The electrical flow parameters may relate to the voltage and/or current across the primary coil 8008, and may include, but are not limited to, the frequency and/or amplitude thereof. As such, the monitoring system 8014 may comprise a voltage monitor 8020 configured to measure the voltage across the primary coil 8008, and a current monitor 8022 configured to measure the current across the primary coil. It will be noted that while the voltage and current monitors 8020, 8022 are illustrated schematically as being distinct element, a single element may be provided which performs the functions of both without departing from the scope of the present disclosure, *mutatis mutandis*. In addition, it is configured to filter the measured electrical flow parameters based on a set of filter characteristics, thereby producing a response signal.

The controller 8016, which may comprise or be constituted by a microcontroller, is configured to direct operation of the wireless power transmitter 8000, i.e., the operation of its components. It is configured, inter alia, to perform error checking, for example to detect, e.g., based on the electrical flow parameters measured by the monitoring system 8014, an error condition. The error condition may be indicative of a foreign object introduced between the primary coil and the secondary coil, which affects the relationship among at least some of the electrical flow parameters. In order to facilitate the error checking, the controller 8016 may comprise a comparator 8032, as will be described below.

The controller 8016 may be further configured to facilitate interrupting the electrical potential to the primary coil, for example when the error condition is detected.

Figure 13:
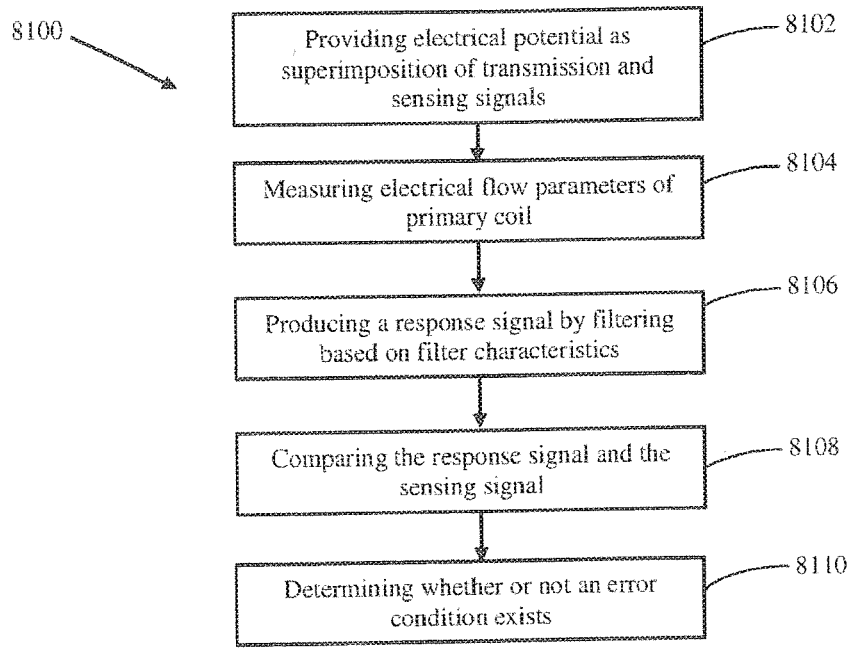
FIG. 13 is a flow diagram illustrating a foreign object test performed by the wireless power transmitter illustrated in FIG. 12.

According to one example, as illustrated in FIG. 13, the error checking may comprise a method 8100, with the following steps:

In step 8102, the controller 8016 directs the driver 8012 to provide the electric potential as a signal being a superposition of a transmission signal, which is for transmission of power to the wireless power receiver 8002, and of a sensing signal.

In step 8104, the monitoring system 8014 measures electrical flow parameters of the primary coil 8008.

In step 8106, the monitoring system 8014 produces a response signal by filtering the measured electrical flow parameters based on a set of filter characteristics which characterize the transmission signal.

In step 8108, the controller 8016 compares, e.g., using the comparator 8032, one or more electrical flow parameters of the response signal on the one hand, and on the other hand corresponding electrical flow parameters of the sensing signal.

In step 8110, the controller 8016 determines, based on the comparison of step 8108, whether or not an error condition such as a foreign object exists between the primary and secondary coils 8008, 8004. If the compared characteristics of the response signal are determined by the controller 8016 to be about the same as those of the sensing signal response, it may determine that no such error condition exists, as changes in the electrical flow parameters (measured by the monitoring system in step 8104) which are due to operation of the secondary wireless power receiver 8002 will not affect the sensing signal. If the compared characteristics of the response signal are determined by the controller 8016 to be substantially different, the controller 8016 may determine that an error condition (such as a foreign object between the primary and secondary coils 8008, 8004) exists, and take suitable action (e.g., interrupting the electrical potential to the primary coil).

According to some modifications, the error checking is performed in an ongoing manner during power transmission to the wireless power receiver 8002. According to various modifications, error checking may be performed continuously or at intervals (e.g., once every second) as deemed appropriate by the designer to be sufficient to protect against damage by foreign objects.

The sensing signal may be substantially different from the transmission signal, for example having a frequency which is not in the range that the transmission signal typically varies within. By way of example, the frequency of the sensing signal may be much higher or much lower than the frequency of the transmission signal. The frequency of the transmission signal may be of a constant frequency, which may facilitate the filter characteristics to be hardwired into the monitoring system 8014.

One skilled in the art will appreciate that the difference between the compared characteristics of the response and sensing signals that indicate an error condition may depend on several factors, and will design the wireless power transmitter 8000 accordingly. In addition, he or she will appreciate how different the sensing signal should be from the range of the transmission signal in order to ensure efficient monitoring, and will design the wireless power transmitter 8000 accordingly.

It will be appreciated that while FIG. 8 illustrates control relationships (in broken lines) between the controller 8016 and other elements of the wireless power transmitter 8000, these are by way of illustration only and are non-limiting. One skilled in the art will recognize that other control relationships may exist, and those shown may not exist in practice, *mutatis mutandis*.

The electrical potential may be interrupted in any suitable fashion. According to some examples, the controller 8016 may direct the power supply 8010 and/or driver 8012 to stop the supply of power. According to other examples, the wireless power transmitter 8000 may comprise a circuit breaker 8024, which is configured to selectively connect/disconnect the power supply 8010 to/from the primary coil 8008. This may be useful, for example, when a single power supply 8010 is used to simultaneously provide power to multiple primary coils 8008, thereby allowing the electrical potential to each primary coil to be interrupted with affecting the supply to the other ones.

Figure 14:
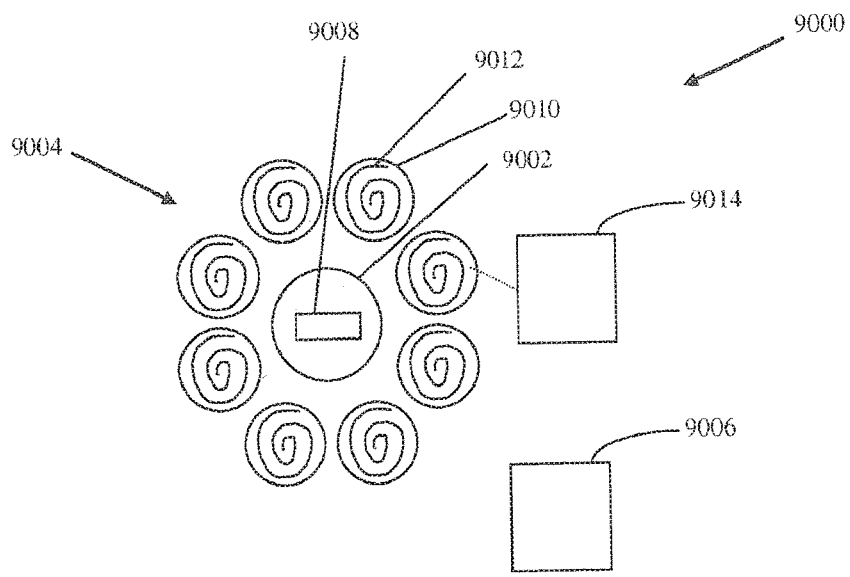
FIG. 14 is a schematic illustration of a wireless charging station according to the presently disclosed subject matter.

As illustrated in FIG. 14, an wireless charging station, which is generally indicated at 9000, may be provided, to assist in detection of foreign objects. The wireless charging station 9000 may, e.g., integrated into a charging surface. The wireless charging station 9000 comprises a wireless power transmitter 9002, a metal detecting array 9004, and a controller 9006.

The wireless power transmitter 9002 may be provided according to any suitable design, many of which are known in the art. For example, it may comprise a primary coil 9008, which is capable of being inductively coupled to a secondary coil, and a power supply having an associate driver (both not shown in FIG. 12) configured to provide a varying electrical potential from the power supply to the primary coil. According to some examples, the wireless power transmitter 9002 is provided in accordance with that described above with reference to FIGS. 8 through 11. The controller 9006 may be configured to work with, or may constitute a part of, the controller 7016 described above with reference to FIGS. 8 through 11.

The metal detecting array 9004 comprises a plurality of metal detectors 9010, each of which may be provided according to any suitable design, many of which are known in the art. For example, each of the metal detectors may comprise a metal detector coil 9012. The metal detectors 9010 are arranged symmetrically around the wireless power transmitter 9002. It will be noted in this regard that the wireless power transmitter 9002 does not need to be arranged symmetrically with the metal detectors 9010, e.g., it may be eccentrically positioned therebetween. According to some examples, the metal detecting array 9004 comprises an even number (i.e., 2, 4, 6, etc.) of metal detectors 9010.

The metal detecting array 9004 may comprise an oscillator 9014, configured to produce an alternating current passing through each of the detector coils 9012, thereby producing the magnetic field. It will be appreciated that while the oscillator 9014 is connected to each of the detector coils 9012, it is only illustrated as being connected to one of them. It addition, it will be appreciated that a single oscillator 9014 may be provided for the entire metal detecting array 9004, or more than one, with each oscillator being connected to one or more of the metal detecting coils.

The controller 9006 is configured to detect a foreign object in the vicinity of the metal detecting array 9004, based on a change in a magnetic field of at least one of the detector coils 9012, which is indicative of the presence of a metal object in the vicinity. According to some examples, the controller 9006 is configured to detect the foreign object by the comparing the changes in the magnetic fields of the coils. The detecting may thus be based on a differential in the changes of different detector coils. This allows the metal detecting array 9004 to be used to detect small metal objects.

It may additionally be configured to interrupt the supply of power via the primary coil 9008, for example, by interrupting power supply thereto.

It will be appreciated that while herein the specification and claims, the term "controller" may be used as if in reference to a single element, it may refer to a combination of elements, which may or may not be in physical proximity to one another, without departing from the scope of the presently disclosed subject matter, *mutatis mutandis*. In addition, disclosure herein (including recitation in the appended claims) of a controller carrying out, being configured to carry out, or other similar language, implicitly includes other elements carrying out, being configured to carry out, etc., those functions, without departing from the scope of the presently disclosed subject matter, *mutatis mutandis*.

Thus, a number of related technologies are presented that use signal transfer systems across a wireless power coupling to regulate the power and to detect and align the two coils.

The scope of the present invention is defined by the appended claims and includes both combinations and sub combinations of the various features described hereinabove as well as variations and modifications thereof, which would occur to persons skilled in the art upon reading the foregoing description.

Those skilled in the art to which this invention pertains will readily appreciate that numerous changes, variations, and modifications can be made without departing from the scope of the invention *mutatis mutandis*.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server, and the like are intended to include all such new technologies a priori.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the composition or method.

As used herein, the singular form "a", "an" and "the" may include plural references unless the context clearly dictates otherwise. For example, the term "a compound" or "at least one compound" may include a plurality of compounds, including mixtures thereof.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the disclosure.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

We claim:

1. A wireless power transmitter used to transfer power to a wireless power receiver, having a secondary coil, the wireless power transmitter comprising:
   a primary coil configured to be coupled with the secondary coil;
   a driver configured to drive the primary coil;
   a controller configured to direct the driver to provide the primary coil with electric potentials that generate a calibration ping signal causing a first decay-time and a test ping signal causing a second decay-time; and
   a monitoring system configured to measure the first decay-time and the second decay-time and record the first decay-time and the second decay-time in a memory module;
   wherein the controller is further configured to detect and report foreign object presence based on a determination of whether the first decay-time is greater than the second decay-time and a determination of whether a difference between the first decay-time and the second decay-time is greater than a threshold.

2. The wireless power transmitter of claim 1, wherein a frequency of the electric potentials that generate the calibration ping signal is different from a frequency of the electric potentials that generate the test ping signal.

3. The wireless power transmitter of claim 2, wherein the frequency of the electric potentials that generate the calibration ping signal is constant, and wherein the frequency of the electric potentials that generate the test ping signal is constant.

4. The wireless power transmitter of claim 1, wherein the monitoring system (1) filters a plurality of first decay-times resulting from a plurality of calibration ping signals, (2) filters a plurality of second decay-times resulting from a plurality of test ping signals, or (3) filters a plurality of first decay-times resulting from a plurality of calibration ping signals and filters a plurality of second decay-times resulting from a plurality of test ping signals.

5. The wireless power transmitter of claim 1, wherein the controller is configured to interrupt said transfer power to the wireless power receiver when a foreign object is detected.

6. The wireless power transmitter of claim 1, wherein the controller is configured to perform foreign object detection continuously.

7. The wireless power transmitter of claim 1, wherein the controller is configured to perform foreign object detection in time intervals.

8. The wireless power transmitter of claim 1, wherein the controller utilizes a comparator to compare the first decay-time and the second decay-time.

9. The wireless power transmitter of claim 1, wherein the electric potentials are a superposition of the calibration ping signal and a transmission signal.

10. The wireless power transmitter of claim 1, wherein the electric potentials are a superposition of the test ping signal and a transmission signal.

11. A wireless power transmitter used to transfer power to a wireless power receiver, having a secondary coil, the wireless power transmitter comprising:
a primary coil configured to be coupled with the secondary coil;
a driver configured to drive the primary coil;
a controller configured to direct the driver to provide the primary coil with electric potentials that generate a calibration ping signal and a test ping signal; and
a monitoring system configured to measure a self-frequency of a decay caused by the calibration ping signal and another self-frequency of a decay caused by the test ping signal and record the self-frequency and the another self-frequency in a memory module;
wherein the controller is further configured to detect and report foreign object presence based on a determination of whether the self-frequency is greater than the another self-frequency and whether a difference between the self-frequency and the another self-frequency is greater than a threshold.

12. The wireless power transmitter of claim 11, wherein a frequency of the electric potentials that generate the calibration ping signal is different from a frequency of the electric potentials that generate the test ping signal.

13. The wireless power transmitter of claim 12, wherein the frequency of the electric potentials that generate the calibration ping signal is constant, and wherein the frequency of the electric potentials that generate the test ping signal is constant.

14. The wireless power transmitter of claim 11, wherein the monitoring system (1) filters a plurality of self-frequencies resulting from a plurality of calibration ping signals, (2) filters a plurality of another self-frequencies resulting from a plurality of test ping signals, or (3) filters a plurality of self-frequencies resulting from a plurality of calibration ping signals and filters a plurality of another self-frequencies resulting from a plurality of test ping signals.

15. The wireless power transmitter of claim 11, wherein the controller is configured to interrupt said transfer power to the wireless power receiver when a foreign object is detected.

16. The wireless power transmitter of claim 11, wherein the controller is configured to perform foreign object detection continuously.

17. The wireless power transmitter of claim 11, wherein the controller is configured to perform foreign object detection in time intervals.

18. The wireless power transmitter of claim 11, wherein the controller utilizes a comparator to compare the self-frequency and the another self-frequency.

19. The wireless power transmitter of claim 11, wherein the electric potentials are a superposition of the calibration ping signal and a transmission signal.

20. The wireless power transmitter of claim 11, wherein the electric potentials are a superposition of the test ping signal and a transmission signal.

* * * * *